Nov. 11, 1952     R. E. KRAFT     2,617,859
CONDENSER TESTING APPARATUS
Filed Dec. 26, 1947
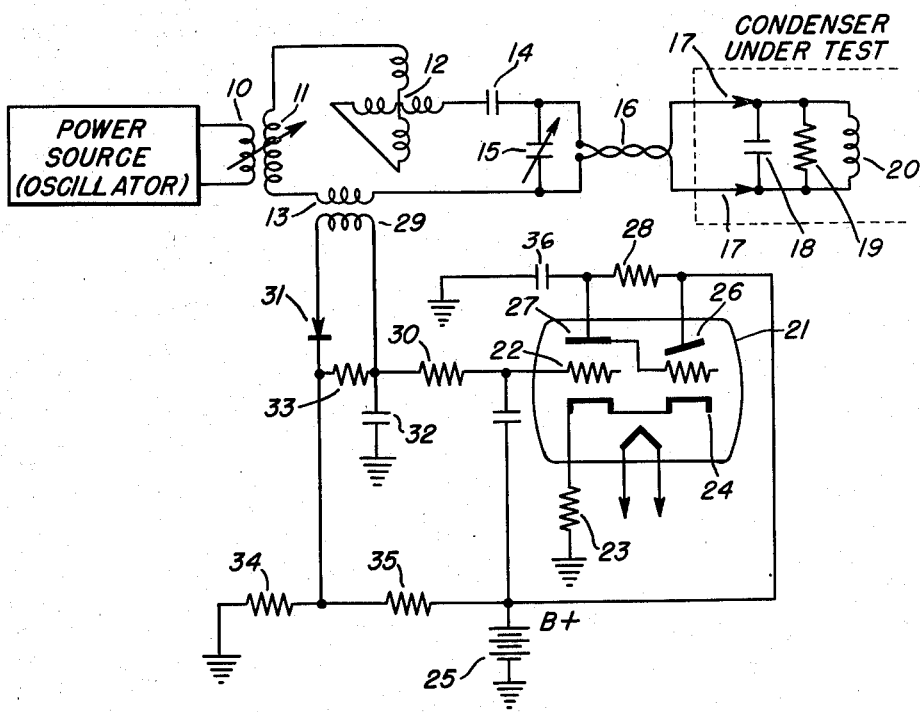
RUSSELL E. KRAFT
INVENTOR.
BY
ATTORNEY Patented Nov. 11, 1952

2,617,859

UNITED STATES PATENT OFFICE 2,617,859

CONDENSER TESTING APPARATUS

Russell E. Kraft, Lake Hiawatha, N. J.

Application December 26, 1947, Serial No. 793,989

2 Claims. (Cl. 175—183)

This invention relates to apparatus for testing condensers and more particularly to a novel apparatus and circuit adapted for the facile determination of the quality of a condenser without removing the condenser from its associated network.

Condensers form a critical component of practically every electronic device and the increasing complexity of electronic circuits entails the use of a large number of such components. For example, the average television receiving set employs approximately 50 condensers of various capacitive ratings and the failure of a single condenser will, in most cases, render the receiver inoperative. One way for the serviceman to locate a faulty or defective condenser is by individually removing each condenser, testing it and resoldering it back into the set. This procedure is not only time consuming and expensive but it offers no assurance of positive results. Condensers very often develop an intermittent defect and the mechanical disturbance accompanying the removal of a condenser from a circuit may alter the structural nature of the unit so that it will test "good" upon a subsequent check; yet upon reinsertion into the circuit the unit may revert to its faulty condition.

In order to render more positive the qualitative testing of a condenser it is essential that the condenser be tested without removing it from the associated network, in fact, with a minimum disturbance of the condenser and its associated components.

I am aware of various circuits and apparatus available for the qualitative testing of condensers in situ. The circuits are so arranged that the condenser under test forms a functional part of a high frequency oscillator circuit. Depending upon the type of circuit employed, a defective test condenser causes the oscillator to either start or cease oscillating and this condition is brought to the operator's attention by means of a suitable indicator.

I have found that existing condenser checkers are incapable of locating a large percentage of faulty conditions which render the particular condenser unsuitable for use. It is known that the condition of a condenser may vary from instant to instant depending upon factors such as the magnitude of the current flowing therethrough, the expansion of the unit with heat, relative movement of the unit under the influence of vibration or potential stresses, etc. Such instantaneous and intermittent behavior of a condenser cannot be established by means of apparatus incapable of electrically loading the condenser to or beyond the normal loading under actual operating conditions. Some attempts have been made to test a condenser while it is actually operating in its circuit but devices designed for this purpose have not met with practical success.

My invention contemplates the provision of a condenser tester wherein the condenser under test is subject to a substantial power loading under which condition any tendency toward failure is aggravated to provide a positive indication of quality. Further, the circuit employed is capable of detecting instantaneous failures regardless of whether the failure results in, or is evidenced by, an increase or decrease in the impedance. I provide a low impedance tuning circuit including means for establishing resonance. Coupled to the tuning circuit is an indicator circuit arranged to indicate any deviation from the resonant condition. A source of radio frequency power, such as an electronic oscillator, is loosely coupled to the tuning circuit; the oscillator serving merely as a source of power and not entering into the functional operation of either the tuning or indicator circuit. A fault developing in the condenser under test detunes the tuning circuit thereby altering the grid bias of an electron ray tube causing a noticeable variation in the angular spread of the fluorescent target. My apparatus also includes manually adjustable elements provided with calibrated dials whereby the setting of the adjustable members provides an indication of the quantitative value, and power factor of the condenser under test.

An object of this invention is the provision of a simple and compact condenser tester providing a definite and instantaneous indication of the quality of a condenser without removing the condenser from its associated network.

An object of this invention is the provision of apparatus for the qualitative testing of a condenser and adapted for use in establishing upward or downward excursions of impedance from rated value whereby such variations in impedance will be indicative of condenser quality.

An object of this invention is the provision of a condenser tester adapted for establishing the qualitative and quantitative values of a condenser without removing the condenser from its associated network.

An object of this invention is the provision of a condenser tester comprising a tuned circuit into which the test condenser may conveniently be inserted, means for tuning said circuit to resonance, an oscillator circuit supplying a selective amount of power to the tuned circuit, and indicating means associated with the tuned circuit and adapted to indicate deviation of said tuned circuit from resonance.

An object of this invention is the provision of a condenser tester comprising a testing circuit that includes the test condenser, a variable inductance for tuning the testing circuit to resonance, a source of alternating current power, means for transferring a selected quantity of power from the source to the testing circuit, an indicator circuit coupled to the testing circuit, and indicating means in the indicator circuit for indicating the relative magnitude of the current flowing in the test circuit whereby momentary variations in the indicating means denotes a defective condenser.

These and other objects and advantages will be apparent from the following description when taken with the accompanying drawing. The drawing is for purposes of illustration and is not to be construed as defining the scope or limits of the invention, reference being had for this purpose to the appended claims.

The single figure of the drawing illustrates a representative wiring diagram of a condenser tester made in accordance with this invention.

A condenser tester made in accordance with my invention comprises broadly three elements, a source of radio frequency power, a tuning circuit that includes the condenser under test, and an indicator circuit.

Referring now to the drawing, the internal source of power for the apparatus is a vacuum tube oscillator operating at a fixed frequency. Such oscillators are well known in the art and are susceptible of a wide range of designs to meet specific requirements. In this case the oscillator is represented by the solid line block, with the oscillator coil 10 brought out. The oscillator serves merely as a source of alternating current power for the tuning and indicator circuits and its design and construction is a matter of choice and economics unburdened by critical requirements or characteristics as is the case with prior devices of this class.

The tuning circuit comprises two sections. The section forming an inherent part of the apparatus comprises a pick-up coil 11 adjustably coupled to the oscillator coil 10, a variable inductance 12 and a primary coupling coil 13, together with a fixed condenser 14 and a variable condenser 15. The actual value of the fixed condenser 14, the variable condenser 15, and the value of the inductance 12 are chosen so that the circuit may be brought into resonance at the frequency of the oscillator serving as the power source. Adjustable condenser 15 is preset at the factory to establish the desired test range of the apparatus as will become more apparent, below.

One coil of the variable inductance 12 is attached to a shaft provided with an index knob cooperating with a dial carrying suitable markings. I prefer to mark the dial in values corresponding to the capacity range of the condensers to be tested by the particular apparatus and having an end position marked "OPEN" for purposes explained below.

It will be apparent that maximum current will flow in the tuning circuit when it is tuned to resonance. The tuning circuit may be connected to a condenser 18 to be tested by the paired cable 16 provided with connection clips 17. As is usually the case, the condenser 18 is connected into a network that may include a resistance 19 and an inductance 20. By employing a source of power having a relatively high frequency the impedance of the condenser under test is low relative to the impedance of the parallel network to which the condenser may be connected. I have found that a frequency of 1000 K C is satisfactory for testing most of the condensers likely to cause trouble in electronic devices as the parallel network existing across such condensers seldom falls below 100 ohms.

The indicator circuit comprises an electron ray tube 21 such as, for example, a type 6E5, in which the amplitude of the unidirectional voltage impressed on the grid 22 determines or controls the angular spread of the shadow on the target. Circuit connections to the electron ray or "magic eye" tube are conventional and include a biasing resistor 23 between the cathode 24 and the negative side of a voltage source 25. Although the voltage source is shown as a battery for purposes of simplicity, it is apparent the necessary biasing potentials for the various tube electrodes can be obtained from a transformer winding and associated rectifier as is common practice in the art. The positive side of the battery is connected to the fluorescent target 26 and, through the plate resistor 28, to the anode 27. A secondary coupling coil 29 forming part of the indicator circuit is inductively coupled to the coil 13 in the tuning circuit such that a voltage induced in the coil 29 is applied to the grid 22 through a rectifier 31. It is apparent the direct current potential developed in this part of the circuit determines the angular spread of the magic eye target 26. Oscillatory voltages are filtered from the circuit by a radio frequency filter comprising the condenser 32 and resistance 33. Resistances 34 and 35 form a voltage divider for establishing the operating condition of the rectifier 31. The condenser 36 is a decoupling and filter condenser.

The above described components and circuits may be housed in a suitable casing and provided with a conventional cable and plug for connecting the apparatus to a common 60 cycle household power supply as is well known. The pick-up coil 11 may be attached to a shaft provided with an index knob cooperating with a dial calibrated in angular degrees to facilitate setting of the coil position with respect to the oscillator coil 11.

The operation of the circuit will now be described.

Prior to the actual testing of a condenser the apparatus is balanced and prepared for testing as follows. With the test clips 17 separated in open circuit position the operator sets the variable inductance 12 to the minimum position by setting the index knob to the "OPEN" marking on the dial. In this position the value of the inductance is such that the tuning circuit is placed in resonance and therefore, the current flow in the tuning circuit will be a maximum. The operator then adjusts the coupling between the pick-up coil 11 and the oscillator coil 10 until the shadow on the target of the electron ray tube just disappears, thereby establishing a reference indication point for the subsequent steps in the process of testing a condenser. Should the operator find it impossible to eliminate the target shadow with the maximum coupling between the coils 10 and 11 he will know that something is wrong with the apparatus.

The test clips 17 are now connected across the condenser 18 to be tested. If the condenser is open circuited there will be no change in the target of the electron tube. If, however, the condenser 18 is not open circuited the added capacitance will detune the tuning circuit resulting in an immediate reduction in the current flow and a corresponding decrease in the potential induced across the coupling coil 29. This reduction in the potential bias on the grid 22 results in a reappearance of the shadow on the target of the electron ray tube.

The operator next adjusts the variable impedance 12 to obtain a minimum target shadow although, at this point in the procedure, the shadow may not be eliminated entirely. The variable inductance 12 is so calibrated with respect to the oscillator frequency and the condensers 14, 15 in the tuning circuit, that a minimum target shadow should result when the dial of the variable impedance 12 is set to the marking corresponding to the capacity value of the condenser under test. Specifically, if the condenser under test has a capacity of .01 mfd. the dial of the variable impedance will be set to a like marking (.01) under which condition the tuning circuit is again placed into resonance. On the other hand, if the operator finds it necessary to set the dial of the variable inductance at a different marking he will know that the capacity of the condenser under test is different from the assumed value. Conversely, the operator may rotate the dial of the variable impedance to obtain a minimum shadow on the electron ray tube target and the setting of the dial then provides a quantitative indication of the condenser under test. Should the operator find it impossible to reduce the shadow on the target throughout the entire range of adjustment of the variable inductance 12 he will know that the condenser under test has a capacity value beyond the range for which the circuit has been preset at the factory.

The operator next adjusts the coupling between the coils 11 and 10 until the shadow of the electron ray tube target again just disappears thereby reestablishing his reference point for the subsequent time testing of the condenser. Readjustment of the coupling between the coils 11 and 10 at this stage should be minor only as the reestablishment of resonance in the tuning circuit by the setting of the variable inductance 12 results in a potential bias on the grid 22 substantially equal to that prevailing when the circuit was initially balanced and prepared for testing purposes. Should the operator find it necessary to increase substantially the power transfer into the tuning circuit he will know the condenser under test has a high leakage; an indication of poor power factor. Similarly, if the operator finds he cannot alter the shadow on the electron ray tube target by a maximum setting of the variable inductance and maximum coupling between the coils 10 and 11, he will know the condenser under test is short circuited.

Having now made the above circuit adjustments the condenser under test is subjected to a test for a period of 30–60 seconds. It is pointed out that during the test period the condenser is subjected to a substantial loading as the indicator circuit constants are so chosen that a current of approximately two (2) amperes is required in the tuning circuit to establish a grid potential sufficient to cause disappearance of the shadow on the target of the electron ray tube. If, during the test period, the target of the electron ray tube remains constant the condenser under test may be considered as of "good" quality. If the shadow on the target becomes displaced permanently, the condenser under test has developed a more or less permanent fault. If the target of the electron ray tube flickers, the test condenser is subject to an intermittent, recurring defect and should be replaced. Subjecting the condenser to the test for 30-60 seconds while under a substantial loading makes it possible to detect the intermittent type of failures which cause so much trouble for the service man and which failures cannot be located by the use of prior apparatus.

It is pointed out that the apparatus will indicate a defective condenser regardless of the directional change in its impedance. Upward and downward excursions of the impedance detune the tuning circuit and will result in a decrease in the current flowing therethrough and a corresponding reduction in the potential bias on the grid of the electron ray tube.

Having now described my invention those skilled in the art will be aware of various modifications that may be made in the arrangement of the parts. Such variations and modifications may be made without departing from the scope and spirit of the invention as set forth in the following claims.

I claim:

1. Condenser testing apparatus comprising a radio frequency power source of fixed frequency; a series circuit adjustably coupled to the power source, said circuit including a variable inductance calibrated in terms of capacity, a primary coupling coil, a relatively high capacity condenser having a relatively low impedance at the power source frequency, and a relatively low capacity condenser having a relatively high impedance at the power source frequency; a pair of test terminals connected directly across the said relatively low capacity condenser, said terminals adapted for direct connection across a condenser to be tested; an indicator circuit coupled to the said primary coupling coil; and a visual indicator connected in the indicator circuit and providing a fixed reference indication when the current flowing in the said primary coupling coil is approximately one ampere.

2. The invention as recited in claim 1, wherein the visual indicator is an electron ray tube.

RUSSELL E. KRAFT.

REFERENCES CITED

The following references are of record in the file of this patent:

UNITED STATES PATENTS

| Number | Name | Date |
|---|---|---|
| 2,135,017 | Sharland | Nov. 1, 1938 |
| 2,146,073 | Jennens et al. | Feb. 7, 1939 |

OTHER REFERENCES

Hund, High Frequency Measurements; McGraw-Hill, New York, 1933, pages 216–219, 221, 222, 245, and 246.

Radio World, July 1936, pages 16–17.

Radio-Craft, May 1945, pages 496, 499.

Barnett, Electrical World, Mar. 30, 1946, page 78.